No. 896,765. PATENTED AUG. 25, 1908.
C. S. SEARS.
CLOTHES LINE REEL AND STRETCHER.
APPLICATION FILED JAN. 18, 1907.
2 SHEETS—SHEET 1.
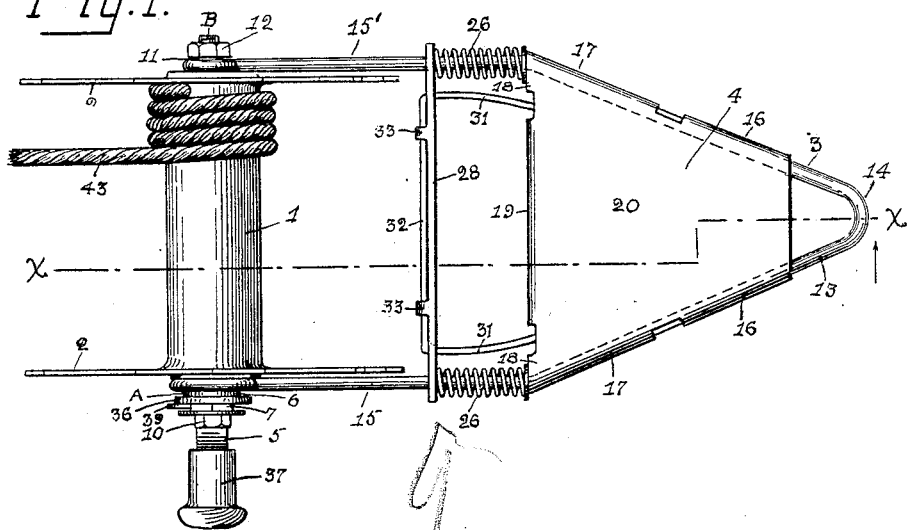
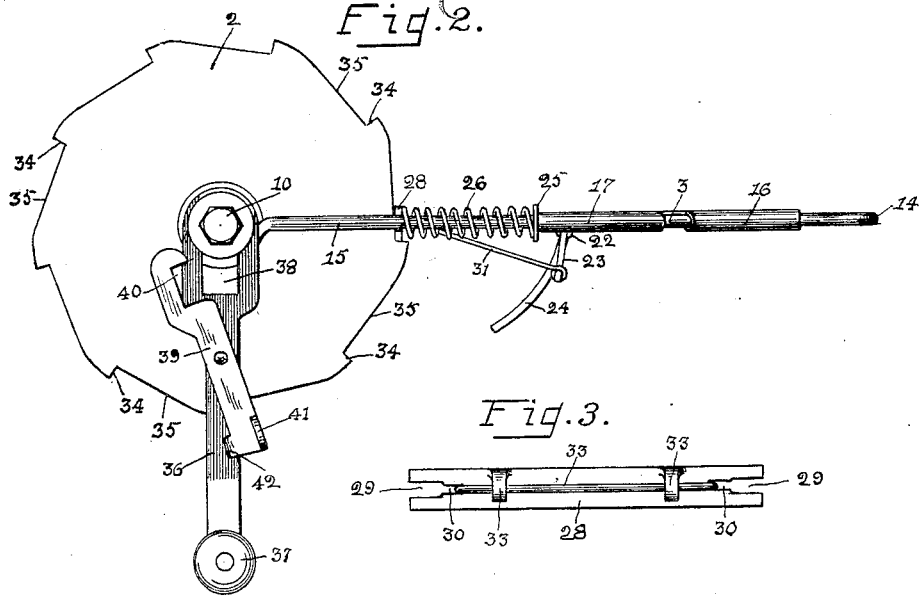
WITNESSES:
D. C. Walter
J. M. Barringer
INVENTOR.
Corydon S. Sears
by Robt B Wilson
Attorney

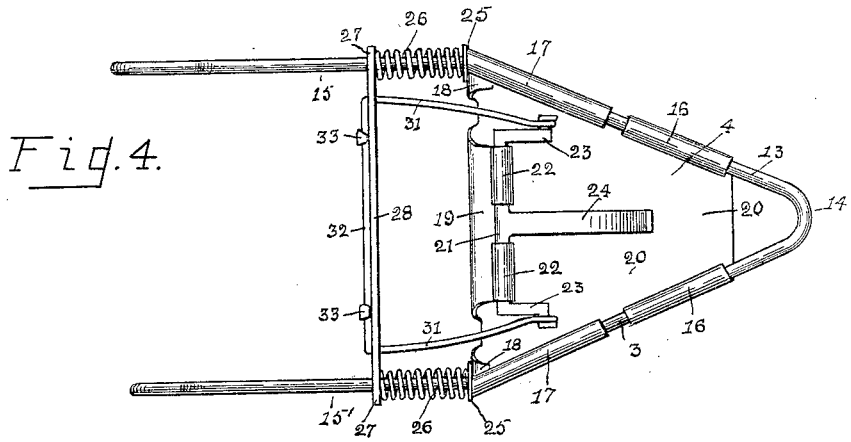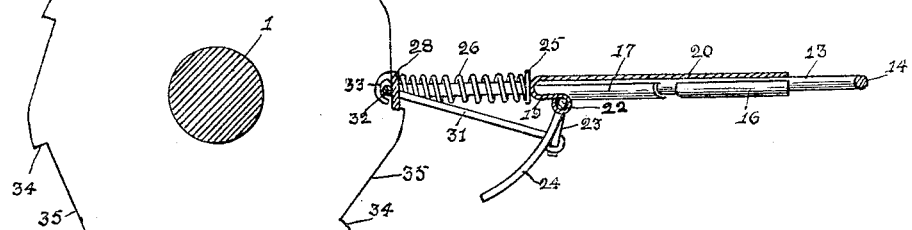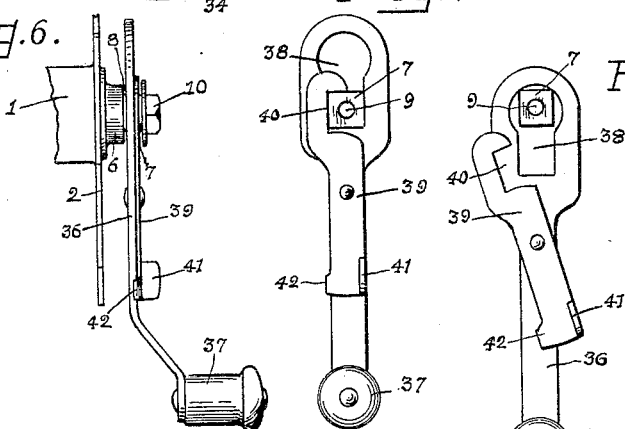

UNITED STATES PATENT OFFICE.

CORYDON S. SEARS, OF TOLEDO, OHIO.

CLOTHES-LINE REEL AND STRETCHER.

No. 896,765.  Specification of Letters Patent.  Patented Aug. 25, 1908.

Application filed January 18, 1907. Serial No. 352,941.

*To all whom it may concern:*

Be it known that I, CORYDON S. SEARS, a citizen of the United States, residing at Toledo, in the county of Lucas and State of Ohio, have invented a new and useful Improvement in Clothes-Line Reels and Stretchers, of which the following is a specification.

My invention relates to a clothes line reel and stretcher, and has for its object to provide a device of the kind that is of simple and economical construction and convenient for hanging and stretching the line for use, and for its detachment and storage when not in use. I accomplish these objects by the construction and combination of parts, as hereinafter described and illustrated in the drawings, in which Figure 1 is a top view of a clothes line reel constructed in accordance with my invention. Fig. 2 is an end view of the same. Fig. 3 is a side view of the lock bar. Fig. 4 is a bottom view of the bail. Fig. 5 is a section on line $x$—$x$ of Fig. 1. Fig. 6 is a broken away side view of one end of the spool with the combined wrench and crank locked for use as a crank. Fig. 7 is a side view of the wrench and crank locked in position for use as a crank, and Fig. 8 is a similar view of the same, unlocked, and in its loosened position as a wrench.

In the drawings 1 designates the spool or axle of the reel, 2 the ratchet toothed end disks of the spool, 3 the bail having the hand plate 4, and 5 the combined wrench and crank.

The spool or axle 1 is provided at one end with an extension A beyond the adjacent disk 2, which is provided with the concentric bail bearing portion 6, the reduced squared portion 7 for the attachment of the crank, and forming a shoulder 8, and the reduced concentric portion 9, which is threaded to receive a retaining nut 10. The opposite end of the spool is provided with an extension B, beyond the other disk 2, which has a reduced bail bearing portion 11, which outside of the bearing is threaded to receive a retaining nut 12.

The bail 3 is formed of a suitable length of spring steel wire, the central portion 13 of which is bent V shape with a rounded apex 14 for engaging a hanging hook, and the outer end portions are bent parallel to form the spring arms 15 and 15', which are of a length to extend the portion 13 a suitable distance beyond the periphery of the disks 2. The outer end portions of the arms 15 and 15' are respectively bent to form end eyes of suitable diameters for pivotally mounting the bail on the bail bearings 6 and 11.

To the V shaped central portion 13 of the bail is secured the head plate 4, which is formed of a suitable blank of sheet metal cut to form the opposite ear portions 16 and 17, the shoulder portions 18, and the bifurcated ear portion 19, extending from the base of a body portion 20, of the form of a truncated triangle. The hand plate 4 is secured to the top side of the portion 13 of the bail by turning the side ears 16 and 17 respectively oppositely around the bail. The shoulder portions 18 are then bent inward over the central plate 20, abutting the ear portions 17, and form shoulders which prevent any buckling of the plate under a pulling strain upon the V portion of the bail.

The ear portion 19 is first bent underneath and parallel with the body portion 20 of the plate 4, after which the bifurcations of the ear are bent downward and outward around the crank rod 21, to form the thimble bearings 22 for the crank rod, which is provided with the end cranks 23, and the central lever arm 24.

On the arms 15 and 15' are first mounted the washers 25, which shoulder against the ear portions 17, and the shoulder portions 18, and next to the washers 25 the arms are provided with the helical springs 26, against the opposite ends of which are abutted the bifurcated end portions 27 of the lock bar 28, which extends transverse the bail arms. The incuts 29 forming the bifurcations of the bar 28 have reduced extensions 30, through which extend to the cranks 23, the connecting arm portions 31 of an unlocking bail 32, the central portion of which extends along and in engagement with the inner face of the lock bar, and is secured thereto by the flexible lugs 33 of the bar, bent around the central portion of the lock bail. The outer ends of the arms 31 are looped around the cranks 23, and the arms 31 are of such length that when the lock bar 28 is in engagement with the disks 2 of the spool, the cranks 23 extend at nearly right angles to the plate 4 as shown in Fig. 2, and the lever arm 24 extends in a curve slightly forward of the cranks towards the reel.

The peripheries of the disks 2 are incut at regular intervals to form the shallow shoulder ledges 34 at right angles to the longer sides 35. The springs 26 are of a length to hold the lock bar 28 pressed against the disks, when the cranks 23 are in position as shown in Fig. 5, in which position when the disks are revolved clockwise the springs yield to allow the projecting portions of the disks to pass the lock bar, which is forced by the springs 28 into the incuts after passing the ledges 34, with the side of the lock bar in square engagement with the sides 35 in which position the lock bar is adapted to squarely engage both the sides 35 and the shoulders 34, and lock the reel against revolving non-clockwise while permitting it to be revolved in the opposite direction. When so locked it may be readily released by movement of the lever arm 24 from the reel, until it engages the plate 4. In this movement the cranks 23 draw back the lock bar against the pressure of the springs, which, after the cranks have passed their rearward centers hold the bar locked open.

The squared portion 7 of the extension A of the spool has mounted thereon the combined crank and wrench 5, which is adapted to retain, on its bearing 6, the bail arm 15, and to be retained on the squared portion by the nut 10 run on the threaded end portion 9.

The crank 5, which comprises the lever arm 36, and the handle 37 projecting at right angles from one end portion, is made adapted for use either as a crank or a wrench to revolve the reel, or to permit the revolving of the reel without revolving the crank, by providing the opposite end portion of the arm 36 with an opening 38, that is enlarged and circular adjacent to the end of the arm and squared and reduced towards the handle, to fit over the squared portion 7 of the extension A, and by centrally pivoting to the outer face of the arm 36 the spring lock latch 39, one end portion of which is provided with a squared notch 40, adapted to engage the squared portion 7 of the extension A, and the opposite end portion with a projecting ear 41, for conveniently operating the latch, and with the incline locking lug 42, which when the latch is in engagement with the squared portion 7 drops over the edge of the arm 36 and locks the latch in such position, as shown in Fig. 7. When pressure is applied to the ear 41 to open the latch, the lug 42 springs the handle end portion of the latch outward and frictionally locks the latch in an open position as shown in Fig. 8.

The combined crank and wrench 5 may be used as a crank to revolve the reel, when the inner squared portion 38 of the crank arm is locked in engagement with the squared portion of the extension A by the latch 39, as shown in Figs. 6 and 7, or it may be used as a tightener wrench when in the unlocked position shown in Fig. 2, by (1), moving it loose on the portion 6 a quarter turn upward to the right from its pendent position; (2), moving it endwise until the squared portion 7 is in the squared portion of the opening; and (3), moving it downward a quarter or more of a turn, and repeating these three operations as often as required to tighten the line.

The retaining nut 10 is preferably a flanged cap nut, but the ordinary nut with a washer may be substituted.

The reel and stretcher thus constructed, when the line 43 is wound thereon, and the lever 24 is in its forward position as shown in Fig. 2, is locked by the lock bar 28 against unwinding, and in that condition it may be hung up by the bail for storage or conveniently carried thereby to its place for use. For use, the outer end of the line is attached to a suitable support, and the reel, being unlocked by the lever 24, and the crank being unlocked and loosened, may be carried past, (and the line attached to,) any intermediate supports, to its point of fastening, the reel revolving to unwind the line without turning the crank with it, as it is carried to its support, where it is hung by the bail on a suitable hook. After releasing the lock bar the line may then be stretched taut by the crank 5, used as a wrench as hereinbefore described.

To detach the line from its supports and wind it on the reel the crank is attached, the lever 24 is moved to withdraw the lock bar, and the reel is removed from its hook support and turned bottom side uppermost, in which position, being held in the left hand inserted between the lock bar and the bail plate 4, and gripping the plate, the line may be wound on the reel by turning the crank with the right hand over and forward. When the line is fully wound up on the reel the lock bar is released to lock the reel for carrying and storing.

It is manifest that a reel constructed in accordance with my invention may be advantageously and conveniently used for stretching wires and the like, and I therefore do not limit myself in its use for clothes lines alone.

What I claim to be new is—

1. In a clothes line reel and stretcher, the combination with a spool having toothed end disks and end journals, of a bail having parallel arms journaling the spool, and extending from a connecting central portion, a stay plate secured transverse the central connecting portion of the bail, helical springs mounted on the bail arms abutting the stay plate, a lock bar transverse the bail arms and movable thereon between the springs and the disks of the spool to engage and lock the disks against revolving in one direction and permit their revolution in the opposite direction, and means to withdraw the lock bar from contact with the disks and retain it in such withdrawn position.

2. In a line reel and tightener, the combination with a spool having ratchet toothed end disks, and provided with end journals, one of said journals being provided with a squared portion to receive a crank, a bail mounted on the spool journals, and means mounted on the bail adapted to yieldingly engage the ratchet teeth of the spool disks and lock the reel against revolving in one direction and permit its revolution in the opposite direction, of a crank for the reel, having an opening at one end portion to receive the squared portion of the journal, said opening, as to its outer portion being circular and of a diameter greater than the diameter of a circle circumscribing the angles of the squared portion, and at its inner portion being squared and reduced to fit over the squared portion of the journal, whereby the crank is adapted to be used as a wrench for turning the spool, and means to retain the crank on the squared portion of the journal.

3. In a line reel and tightener, the combination with a spool having ratchet toothed end disks, and provided with end journals, one of said journals being provided with a squared portion to receive a crank, a bail mounted on the spool journals, and means mounted on the bail adapted to yieldingly engage the ratchet teeth of the spool disks and lock the reel against revolving in one direction and permit its revolution in the opposite direction, of a crank for the reel, having an opening at one end portion to receive the squared portion of the journal, said opening, as to its outer portion being circular and of a diameter greater than the diameter of a circle circumscribing the angles of the squared portion, and at its inner portion being squared and reduced to fit over the squared portion of the journal, whereby the crank is adapted to be used as a wrench for turning the spool, and a latch pivotally mounted on the body portion of the crank, adapted to be engaged with or disengaged from the squared portion of the journal, when the squared portion of the journal is in the squared portion of the opening of the crank, substantially as and for the purpose set forth.

In witness whereof, I have hereunto signed my name in the presence of two subscribing witnesses, this 5th day of January, 1907.

CORYDON S. SEARS.

In presence of—
  Charles Fox,
  F. J. Eschenburg.